June 27, 1961  E. S. WHITE  2,989,779
TIRE PRESSURE RETAINER MOUNTING FOR TIRE RETREADING MOLDS
Filed Sept. 1, 1954  4 Sheets-Sheet 1
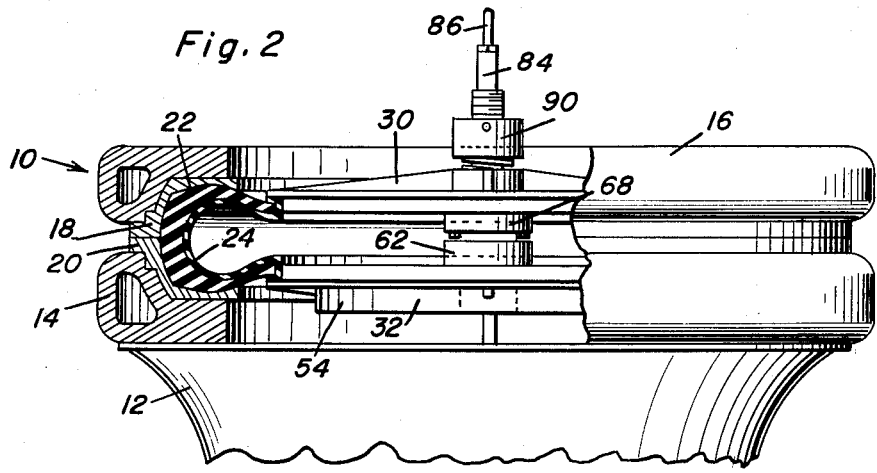
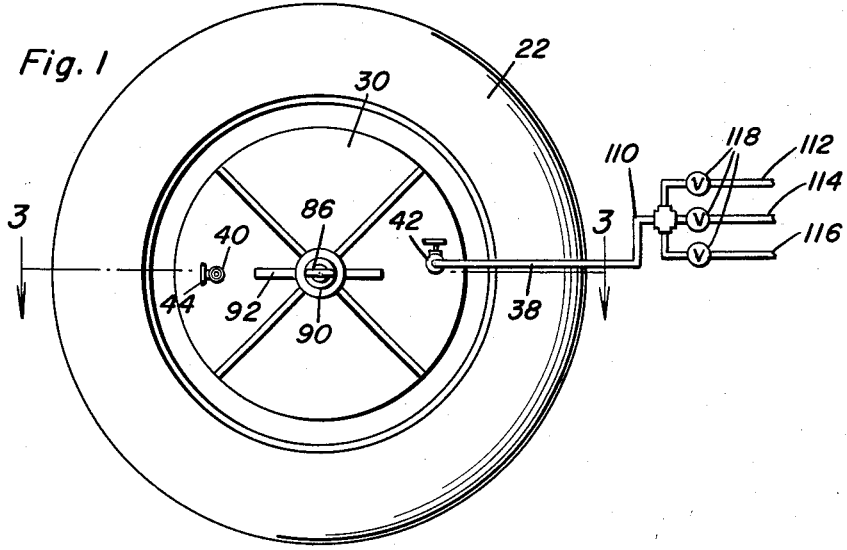
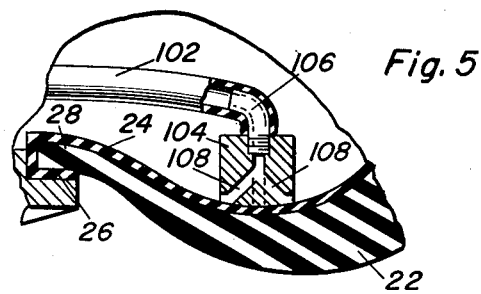
Eldridge S. White
INVENTOR.
BY *Clarence A. O'Brien*
*and Harvey B. Jacobson*
Attorneys Eldridge S. White INVENTOR.

June 27, 1961  E. S. WHITE  2,989,779
TIRE PRESSURE RETAINER MOUNTING FOR TIRE RETREADING MOLDS
Filed Sept. 1, 1954  4 Sheets-Sheet 3
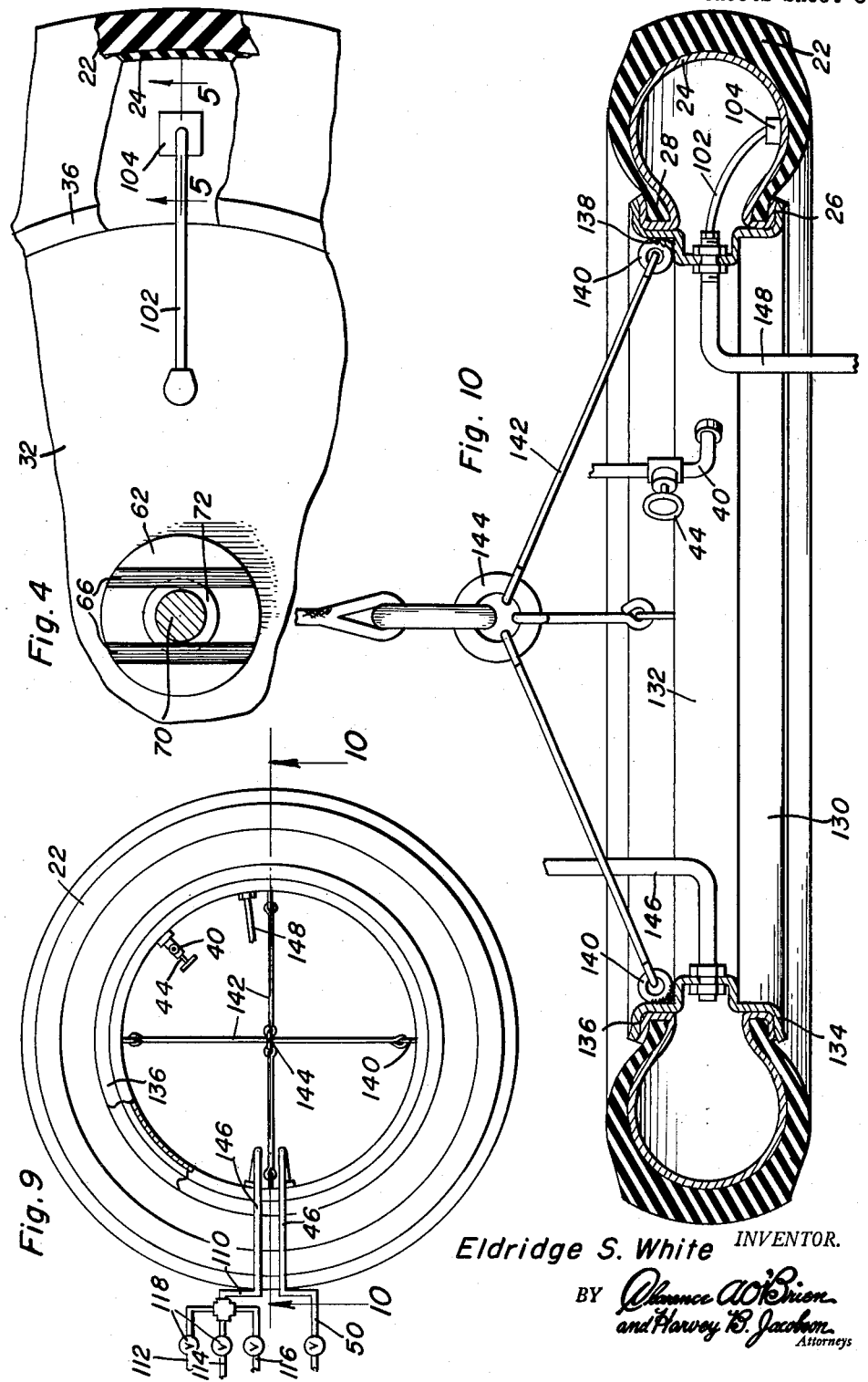
Eldridge S. White INVENTOR.

June 27, 1961 E. S. WHITE 2,989,779
TIRE PRESSURE RETAINER MOUNTING FOR TIRE RETREADING MOLDS
Filed Sept. 1, 1954 4 Sheets-Sheet 4
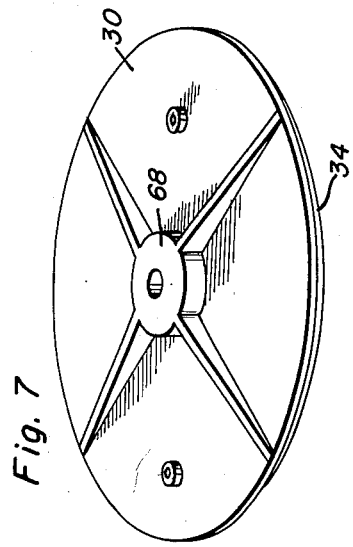
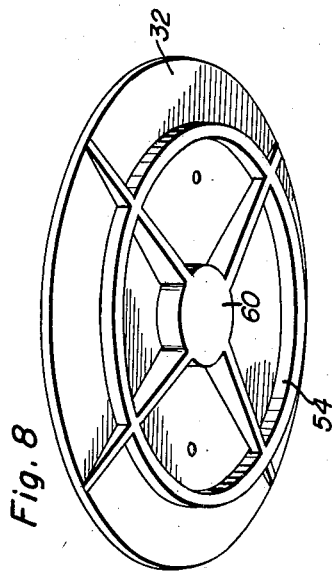
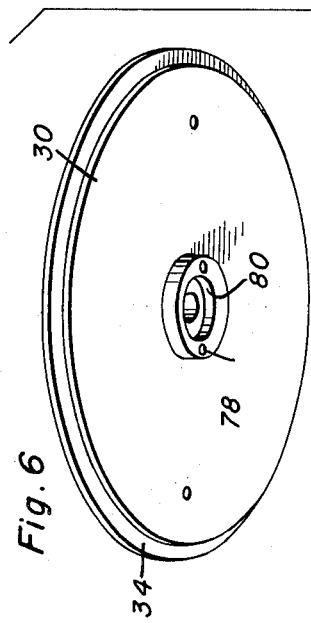
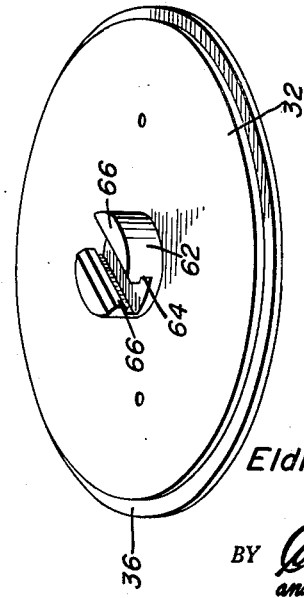
Eldridge S. White
INVENTOR.
BY *Clarence A. O'Brien*
and *Harvey B. Jackson*
Attorneys United States Patent Office 2,989,779
Patented June 27, 1961

2,989,779
TIRE PRESSURE RETAINER MOUNTING FOR TIRE RETREADING MOLDS
Eldridge S. White, Florence, Ala., assignor to Robbins Tire and Rubber Company, Inc., Tuscumbia, Ala., a corporation of Alabama
Filed Sept. 1, 1954, Ser. No. 453,548
20 Claims. (Cl. 18—18)

This invention comprises novel and useful improvements in a tire pressure retainer mounting for tire retreading molds and more specifically relates to a mounting for tire casings whereby pressure may be retained therein during retreading operations in a tire retreading mold and during the introduction of the casing and its mounting into and its removal from such molds.

The principal object of this invention is to provide a pressure retaining means for tire casings by means of which pressure may be retained within a tire casing while the casing is being treated in a tire retreading mold and also during the introduction of the casing into the mold and its removal therefrom.

A further important object of the invention is to provide a combined means whereby a tire may be conveniently handled during its introduction into and its removal from a tire mold; and whereby a fluid medium under pressure may be introduced into and removed from a tire through its mounting means.

A further and specific object of this invention is to provide a tire mounting means which may be applied to a tire casing for sealing the interior thereof against the atmosphere, and for introducing and removing fluids under pressure, and which may be utilized to support a tire and further may be utilized with various conventional tire retreading molds.

More generally, it is a primary purpose of this invention to improve the operation of conventional tire retreading molds by providing a means which will facilitate introduction of tires and removal of tires from such molds while retaining pressures within the tire.

Yet another object is to provide a mounting assembly for tire casings for use in a tire retreading mold which shall be adjustable to accommodate different sizes of tires.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the tire pressure retainer and mounting means associated with a tire;

FIGURE 2 is a vertical elevational view of a portion of a tire retreading mold and showing in vertical transverse section the manner in which the tire and its pressure retaining and mounting means is inserted in a conventional mold during a tire retreading operation;

FIGURE 4 is a fragmentary horizontal sectional detail view taken substantially upon the plane indicated by the section line 4—4 of FIGURE 3 and showing certain details of the mounting device;

FIGURE 5 is an enlarged detail view in vertical section of the right hand portion of FIGURE 3 and showing the provision of a condensate drain means associated with the tire and its mounting device;

FIGURE 6 is a group assembly view showing in perspective the inner or adjacent surfaces of a pair of sealing plates forming a part of the tire mounting device;

FIGURES 7 and 8 are perspective views of the upper and lower sealing plates forming a part of the mounting device;

Figure 3:
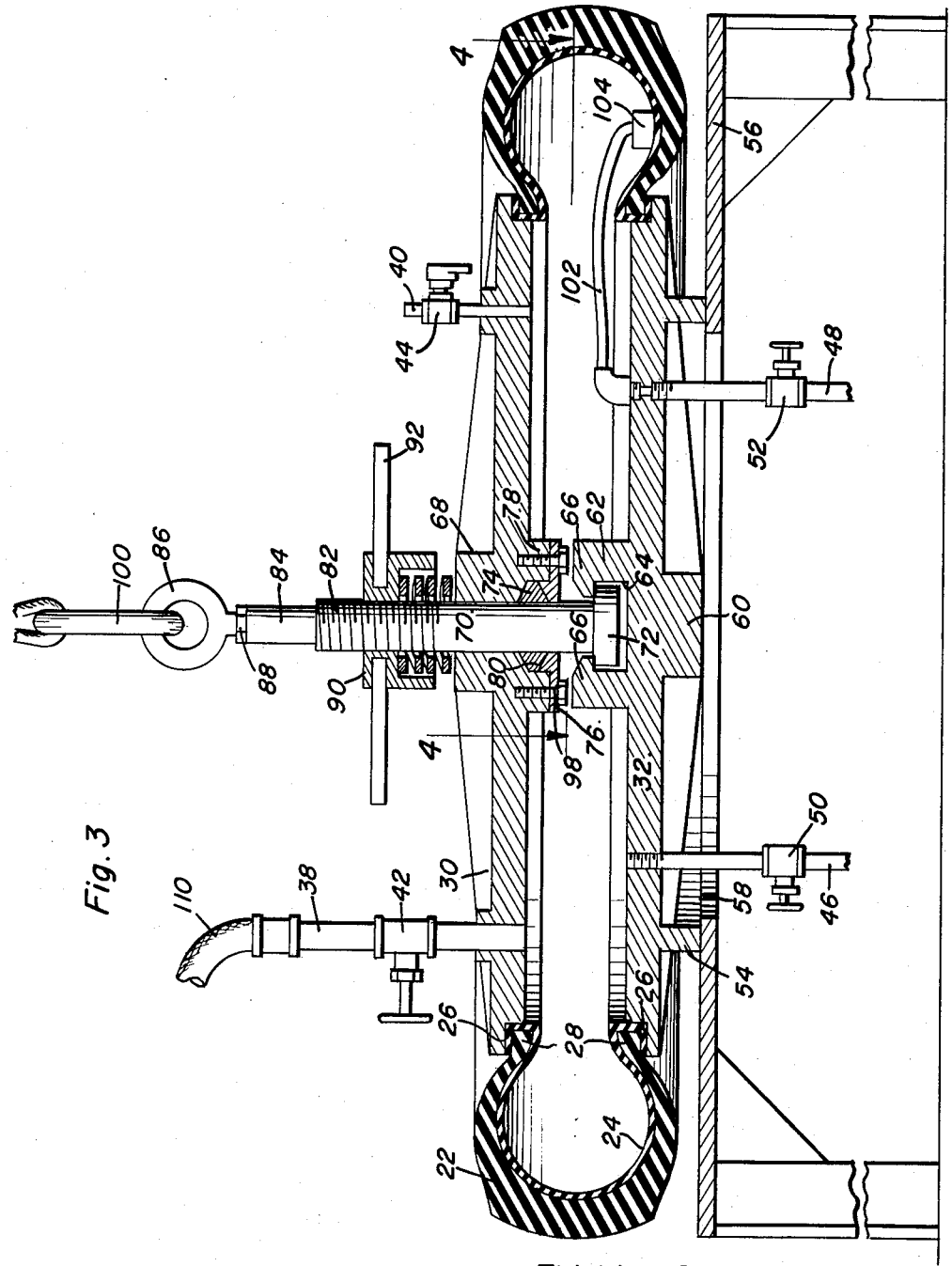
FIGURE 3 is a vertical transverse sectional view taken upon an enlarged scale substantially upon the plane indicated by the section line 3—3 of FIGURE 1, the tire and its mounting means being shown resting upon a supporting table either prior to its introduction into a mold or after the same has been removed from a mold upon completion of the retreading operation.

FIGURE 9 is a view similar to FIGURE 1 but of a modified embodiment of a tire mounting device; and FIGURE 10 is a detailed view taken on an enlarged scale substantially upon the plane indicated by the section line 10—10 of FIGURE 9 and showing the manner in which the mounting device is sealingly engaged with the beads of a tire for supporting the same and for introducing fluid under pressure into and out of the tire.

The present invention relates to subject matter which is similar to that set forth in my prior co-pending applications Serial No. 376,804, now Patent No. 2,835,921; Serial No. 453,277; Serial No. 454,132, now Patent No. 2,791,805; Serial No. 447,081; and Serial No. 453,817, now Patent No. 2,834,049. In said prior co-pending applications there are disclosed various forms of apparatus whereby the beads of a tire may be sealed against the atmosphere and fluid pressure may be applied to or withdrawn from the interior of the tire casing while the same is positioned within a tire retreading mold to effect the retreading operation thereon. In such embodiments as described in my co-pending applications, it is necessary to seal the beads of the tire against the atmosphere while the tire is in the mold; and to remove this seal before the tire can be withdrawn from the mold.

The fundamental purpose of the present invention is to provide a construction whereby the space within a tire may be sealed from the atmosphere by a mounting device which is applied to a tire casing in order that the tire may be separately sealed and thereafter applied to or removed from a mold without removing the seal applied to the beads of the tire. Further, the means for mounting the tire and for establishing the seal with the beads of the tire is utilized to support the tire to facilitate its positioning in the mold or its removal from the mold while retaining fluid pressure within the tire and/or continuing various tire treating operations by fluid medium retained in or circulated through the interior of a tire.

Reference is made first to FIGURES 1–8 for an understanding of a preferred embodiment for carrying out the purposes of this invention. In this arrangement the numeral 10 designates generally any conventional form of tire retreading mold and which includes a stationary base 12 having a stationary mold section 14 thereon together with an upper movable mold section 16 hingedly connected to the lower section in any desired manner, not shown. Disposed within the two mold sections are the mold matrices 18 and 20 which may be replaced as desired in order to enable the retreading mold to be adjusted to accommodate different sizes of tires.

A tire casing to be retreaded is indicated at 22 while the numeral 24 shows a tire liner sleeve which may be applied to the interior of a tire in order to render the tire carcass impervious to the passage of fluid therethrough.

This sleeve includes the flanged portions 26 at its rim, which flanged portions are adapted to embrace the beads 28 of the tire casing. The liner sleeve may be of any of the types disclosed in my above referred to co-pending applications, the principles of the present invention being not limited to any particular type of liner sleeve and in fact being useful even when the liner sleeve is omitted.

As shown best in FIGURE 3, the tire pressure retainer mounting consists of upper and lower sealing plates 30 and 32, see in particular FIGURES 6–8. Upon their rims, the inner surfaces of these plates are provided with flanged shoulder portions 34 and 36 respectively which as shown in FIGURE 3 are adapted to seat against the bead of the tire and to press and secure the rims of the liner sleeve and their flanges 26 against the beads 28. By this means the upper and lower sealing plates seal the beads of the tire and consequently the interior of the tire from the atmosphere whereby fluid pressure may be applied into and maintained within the tire casing.

Extending through and upwardly from the upper sealing plate 30 are a pair of conduits 38 and 40 under the control of manually operated valves 42 and 44 respectively. Extending through and secured to the lower sealing plate 32 is a further pair of conduits 46 and 48 likewise provided with manually operated control valves 50 and 52.

Depending from the bottom plates 32 is an annular rim or rib 54 which serves as a support for their mounting and a tire carried thereby, as shown in FIGURE 3, whereby the tire and its mounting may be rested upon a support table or frame 56, having an opening in its central portion as at 58 to receive the above-mentioned conduits 46 and 48.

The bottom plate at its central portion is provided with a downwardly extending lug 60 and with an upwardly extending projection 62. This last mentioned projection, as shown clearly in FIGURE 6, is provided with an undercut diametrically extending slot 64 having overhanging lips 66, this slot being open at its upper surface.

Disposed centrally of the upper sealing plate 30 is an upwardly extending tubular boss 68 and the shank of a bolt 70 is received in this boss. The head of the bolt 72 is of a sufficient size to be slidably received in the undercut slot 64 whereby the two plates may be secured together for limited movement toward and from each other as set forth hereinafter. A fluid sealing or packing member 74 surrounds the bolt 70 upon the interior surface of the top sealing plate 30, being removably retained as by a packing retainer member 76 of any conventional design. The arrangement is such that the bolt may be moved longitudinally or axially in the boss 68 by appropriate movement of the plate 30 relative to the plate 32. When once the head of the bolt is seated in the undercut slot, however, it cannot be withdrawn except by diametrical movement of the bolt and of the upper plate relative to the lower plate.

As will be best apparent from a comparison of FIGURES 3 and 6, the inner surface of the upper plate 30 is provided with a depending annular boss 78 having a chamber 80 therein for the reception of the packing member 74 previously mentioned.

The upper end of the bolt 70 is provided with a threaded portion 82 and terminates in a diametrically reduced extremity 84 which is internally threaded to receive the external end of an eye-bolt 86, a lock nut 88 being provided to maintain the eye-bolt and the extension 84 together. Threaded upon the portion 82 of the bolt 70 is a tensioning nut 90 having finger-grip wings 92 extending therefrom whereby the nut may be rotated. A compression spring 94 encircles the bolt 70 and has one end abutting against the boss 68, and the other end received in a socket in the nut 90.

As will now be seen from FIGURE 3, the spring yieldingly urges the two plates 30 and 32 toward each other and thereby causes the same to be resiliently clamped upon the outside surfaces of the tire beads 28 and to hold the flanges 26 of the sleeve liner sealingly clamped thereagainst. Movement of the plates toward each other may be adjustably limited by the provision of a plurality of adjusting bolts 98 threaded into the boss 78 and adapted to abut the top surface of the boss 62 to limit approach of the two plates together. Movement of the plates from each other is yieldingly resisted by the spring 94, and the strength of this spring is adjusted by the nut 90, while the lower edge of the nut constitutes a positive abutment engageable with the boss 68 to limit further movements of the plates away from each other.

A chain 100 or any other suitable lifting means may be applied to the eye-bolt 86 whereby the tire and the mounting assembly secured thereto may be raised or lowered as desired.

Referring now more particularly to FIGURES 3 and 5 it will be seen that the conduit 48 controlled by the valve 52 is connected to a flexible pipe 102 upon the interior of the pair of sealing plates of the mounting device, and the flexible pipe is in turn secured to a nozzle 104 as by an angular coupling nipple 106. The nozzle 104 is provided with a plurality of inlet passages and orifices 108 and has its inner extremity of a semi-cylindrical or spherical shape to enable it to rest smoothing upon the inner surface of the tire casing 22 or of the liner sleeve 24 disposed therein. When the valve 52 is open, any condensate collecting in the liner sleeve when the tire is mounted upon the sealing plates, such as for example, as condensate from steam or the like, may be discharged from the interior of the tire by means of the nozzle 104. Alternatively, suction may be applied in any desired manner to the conduit 48 to facilitate such removal of condensate.

The conduit 40 with its manual control valve 44 constitutes a means for discharging air from the interior of the tire casing and the mounting device. The conduit 38 constitutes a means for supplying compressed air, or a heating fluid such as steam or a cooling fluid such as water to the interior of the mounting device in the tire casing. For that purpose, the conduit 38 is provided with a flexible hose 110 to which is selectively connected the pipes 112, 114 and 116, each having a manual control valve 118. The pipe 112 is adapted to supply air under pressure through the conduit 38; the pipe 114 supplies the heating fluid such as steam to the conduit 38; and the pipe 116 supplies a cooling fluid under pressure, such as cold water, to the conduit 38.

As above-mentioned the compressed air is exhausted from the tire casing and the mounting device by means of the conduit 40 under the control valve 44. The steam or heating fluid and the cold water or cooling medium are each discharged from the interior of the tire casing and mounting device by the conduit 46 of the control valve previously mentioned.

The operation of this device is as follows:

When the tire is to be retreaded in a retreading mold, the bottom plate 32 is applied to the bead 28 of the tire and the top plate 30 with the bolt 70 and with the nut 90 backed off to its maximum, is positioned with the head of the bolt 72 engaged in the undercut groove 64 and the other bead 28 of the tire is seated in the shouldered groove 34. The bolt 90 is then tightened down, causing the spring 94 to be compressed and urging the plates toward each other and into tight sealing engagement with the beads of the tire. At this time, air is supplied through the pipe 112 and the conduit 30 to the interior of the tire, all of the other valves being closed, in order to inflate the tire to the desired pressure and thereby lock the tire upon its mounting device. During this inflating of the tire, the plate 30 is forced from the plate 32 against resistance of the spring 94 until either this spring resistance is sufficient to stop further movement of the plates from each other, or until the end of the nut 90 is seated upon the surface of the boss 68 thereby adjustably limiting further movement. It will be observed that this means provides for varying the spacing between the plates when the tires are fully inflated, thereby causing the mounting device to be adapted to various sizes and dimensions of tires. It is, of course, evident that the plates themselves may be changed to provide plates of the requisite diameter when the device is to be adapted to tires of different sizes.

With the tire mounted under pressure upon the mounting device, the chain 100 may be applied to the eye-bolt 86 whereby the assembly may be lifted from a supporting bench or stand 56 and may be lowered into a conventional form of tire retreading mold. It will be noted that in this lowering movement the conduits 46 and 48 are disposed in the open interior of the mold, while the tire, without obstruction, may be disposed in the lower mold section 14. The chain 100 is now removed and the top mold section 16 is then closed down and clamped in position, the mold sections then securely holding the tire in proper position for the retreading operation to be performed.

Any suitable source of heat may be employed to effect the heating operation of the retreading process. This heating may be supplemented by or may be formed entirely by the introduction of a heating fluid under pressure to the interior of the tire and mounting device. Thus, the valve 118 of the air supply line 112 may be closed, and the valve 116 of the heating fluid supply conduit may be opened. Then, by proper manipulation of the valve 44 of the air vent line 40, the air may be discharged from the interior of the casing while steam or other heating fluid under pressure takes its place, thereby maintaining the desired internal pressure in the tire during this operation. While the heating operation is being performed, condensate from the steam may be withdrawn through the conduit 48 in a manner which will now be understood.

As soon as the heating operation has been completed and the tire has been retreaded, vulcanized and cured, the upper mold section 16 may be open, the chain 100 again attached to the eye-bolt and the tire and its mounting may be withdrawn and rested upon the supporting table 56. Thereafter, the supply of heating fluid may be cut off by closing the valve 118 of the pipe 114, and a cooling fluid such as cold water or the like may be supplied to the pipe 116 and its own manual control valve 118 to the interior of the tire. During this last step of the operation, the conduit 46 may be opened to permit a flow of the cooling fluid through the tire and thereby circulate the cooling medium, while retaining the desired internal pressure upon the tire until the same has been cured. After the tire has been properly cooled, the supply of all fluids to the tire may be cut off, the fluids in the tire may be withdrawn through the conduit 46, the bolt 90 may be backed off to permit the mounting device to be removed from the rims of the tire.

It will be noted that the present device enables pressures to be applied to or removed from the interior of the tire regardless of whether the tire is in or out of the mold; and further enables the tire to be applied to and withdrawn from a mold in a fully pressurized condition and even while pressure fluids are flowing through the tire casing. Thus, the time required to retread, cure and thereafter cool a tire is greatly reduced and therefore the capacity of a mold apparatus is greatly increased.

In FIGURES 9 and 10 there is disclosed a somewhat modified form of tire pressure retainer mounting. In this form there is provided a rim 130, quite similar to that of a conventional automobile tire rim, which rim has a drop center portion 132 together with a pair of side wall flanges 134 and 136. Secured to one set of these flanges in any desired manner as by welding, as shown at 138, are a plurality of eyes 140 to which are connected links 142 carried by a ring 144 by means of which the mounting device may be supported and handled. The tire casing 22 with its liner sleeve 24 in the manner previously described, is then applied to the rim 130 in a manner similar to the mounting of tires upon automobile rims. When so applied it will be observed that the flanges 26 on the rims of the liner sleeve 24 will be positioned to envelop the beads 28 of the tire casing and will be sealed thereagainst by the bead of the tire pressing against the flanges 134 and 136. A conduit having the L-shaped extremity 146 extends through the drop center 132 and communicates with the interior of the liner sleeve inside the tire casing and a further conduit having an L-shaped portion 148 extends through the rim and has attached thereto flexible conduit 102 and the nozzle 104 previously mentioned and for the same purpose. The control valve 52 of the conduit 48 is identical with that previously described, but has been omitted from the drawings in the interest of simplicity.

As in the manner previously described, the fluid inlet conduit 146 may be connected to the flexible conduit 110 and through this conduit to an air supply line 112, a steam or heating fluid supply line 114 and a cold water or cooling supply line 116, each being under control of a manually operated valve 118. The fluid discharge conduit 46 under the control of a valve 50 as previously mentioned is provided to drain or remove fluids under pressure from the interior of the tire upon its mounting. In a similar manner an air discharge conduit 40 under the control of the manually operated valve 44 serves to discharge and control the discharge of air under pressure from the interior of the tire.

The operation of this form of the invention is identical with that of the previously described embodiment except as to the construction of the mounting device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tire support for use with a tire and a tire retreading mold comprising a pair of imperforate plates and a support rod associated therewith, each plate comprising a sealing means for establishing a fluid tight sealing engagement with a bead of a tire and closing the space bounded by said bead for sealing the space between the plates and within the tire from the atmosphere, said support rod slidably extending through one of the plates and having an inner end disposed in the space between the plates, means securing said inner end of the rod to the other plate, means operatively associated with said rod and said one plate for yieldingly urging the plates towards each other whereby to establish sealing engagement between the plates and the beads of a tire, said securing means including a portion extending towards the other of the pair of plates and constitutes a stop limiting movement of the plates towards each other.

2. A tire support for use with a tire and a tire retreading mold comprising a pair of imperforate plates and a support rod associated therewith, each plate comprising a sealing means for establishing a fluid tight sealing engagement with a bead of a tire and closing the space bounded by said bead for sealing the space between the plates and within the tire from the atmosphere, said support rod slidably extending through one of the plates and having an inner end disposed in the space between the plates, means securing said inner end of the rod to the other plate, means operatively associated with said rod and said one plate for yieldingly urging the plates towards each other whereby to establish sealing engagement between the plates and the beads of a tire, means on the extending end of said rod for lifting, as a unitary assembly, the plates when they are attached to a tire for insertion into and removal from a tire retreading mold, the plate to which said securing means is attached having a ring projecting centrally from its surface which is remote from the other plate whereby the plates and a tire mounted thereon may be rested upon a flat supporting surface when outside a mold, the ring being of such size that it may be received in the central opening of the lower section of a mold when the assembly of a tire and plates are positioned therein.

3. A supporting and mounting device for a tire for use in retreading the same comprising first and second plates, means on the adjacent surfaces of each plate for receiving the bead of a tire, means securing the plates together for clamping a tire by its beads between said plates, securing means including a support rod freely slidable through a central aperture in said first plate and having an inner end disposed within the space between the plates, the second plate having upon its surface adjacent the first plate a channel, said inner end of said support rod having a portion retained in said channel for sliding movement therein, fastening means on the external end of said rod cooperating with the exterior surface of the first plate for adjustably limiting movement of the plates from each other.

4. The combination of claim 3 wherein said second plate has a projection extending towards and constituting a stop for said first plate, said channel being disposed in said projection, said portion on said support rod comprising a lateral projection therefrom receivable in said channel.

5. The combination of claim 3 wherein said fastening means comprises a member longitudinally adjustably secured to said rod, a spring surrounding said rod and interposed between the member and the first plate for yieldingly urging the plates towards each other.

6. The combination of claim 3 wherein said receiving means comprises an annular recess in each plate, the recess being of such size that when the plate is applied to the exterior side of a tire, the outer surface of the tire bead will seat against the bottom wall of the recess while the concave surface of the bead will be disposed at the wall of the recess, the depth of the recess being such that the inner face of the plate will be outwardly of the inside surfaces of the tire bead.

7. The process of retreading a tire which comprises, closing the opening defined by the beads of a tire and sealing the interior of the tire and the space between the bead openings from the atmosphere, applying a fluid under pressure to the interior of a tire, thereafter moving the tire into a retreading mold while maintaining the applied pressure, treating the tire in the mold and thereafter removing the tire from the mold while maintaining the said applied pressure.

8. The method of claim 7 including the step of circulating a cooling medium through the tire after removing the tire from the mold while maintaining the applied pressure.

9. A tire mounting and sealing means for use with a tire and a tire retreading mold including a pair of imperforate, fluid impervious plates and a supporting and fastening means associated therewith, each plate having a sealing means engageable with a bead of a tire for establishing a fluid tight seal therewith thereby closing the space bounded by each bead and sealing the space between the plates and within the tire from the atmosphere, said supporting and fastening means extending slidably through one plate and having a portion disposed in the space between said plates, means disposed in the space between said plates and secured to the other of said plates detachably securing said portion to said other plate.

10. The combination of claim 9 wherein said securing means includes a projection on said other plate extending into said space between said plates and a detachable connection between said portion and said projection.

11. The combination of claim 9 including a fluid packing means on said one plate embracing said supporting and fastening means and establishing a fluid tight engagement therewith.

12. The combination of claim 9 including cooperating stop means on said pair of plates and disposed in the space therebetween and limiting movement of said plates towards each other.

13. The combination of claim 9 including a fluid packing means on said one plate embracing said supporting and fastening means and establishing a fluid tight engagement therewith, cooperating stop means on said pair of plates and disposed in the space therebetween and limiting movement of said plates towards each other, one of said stop means comprising a part of said fluid packing means.

14. The combination of claim 9 wherein said securing means includes a projection on said other plate extending into said space between said plates and a detachable connection between said portion and said projection, cooperating stop means on said pair of plates and disposed in the space therebetween and limiting movement of said plates towards each other, one of said stop means comprising a pair of said projections.

15. The combination of claim 9 including aligned projections on said plates in the space between said plates and extending towards each other, said projections having cooperating surfaces limiting movement of said plates towards each other.

16. The combination of claim 9 including aligned projections on said plates in the space between said plates and extending towards each other, said projections having cooperating surfaces limiting movement of said plates towards each other, said securing means comprising a part of the projection on the other of said plates.

17. The combination of claim 9 including aligned projections on said plates in the space between said plates and extending towards each other, said projections having cooperating surfaces limiting movement of said plates towards each other, a fluid packing means on the projection on said one plate embracing said supporting and fastening means and establishing a fluid tight engagement therewith.

18. The combination of claim 9 including aligned projections on said plates in the space between said plates and extending towards each other, said projections having cooperating surfaces limiting movement of said plates towards each other, said securing means comprising a part of the projection on the other of said plates, a fluid packing means on the projection on said one plate embracing said supporting and fastening means and establishing a fluid tight engagement therewith.

19. The combination of claim 9 including a ring carried by and projecting laterally from said other plate upon the side thereof which is remote from said one plate, the lateral projection of said ring being sufficient to support said plates and a tire mounted by its beads thereon out of contact with a surface upon which the ring may rest when the tire is outside of a mold, the diameter of said ring being such that it may be received in the central opening of a lower mold section when the assembly of a tire and said plates are positioned therein.

20. The combination of claim 9 including support means carried by and projecting laterally from said other plate upon the side thereof which is remote from said one plate, the lateral projection of said support means being sufficient to support said plates and a tire mounted by its beads thereon out of contact with a surface upon which the support means may rest when the tire is outside of a mold; the diameter of said support means being such that it may be received in the central opening of a lower mold section when the assembly of a tire and said plates are positioned therein.

References Cited in the file of this patent

UNITED STATES PATENTS

| | | |
|---|---|---|
| 1,466,318 | Waters | Aug. 28, 1923 |
| 1,605,683 | Meyer et al. | Nov. 2, 1926 |
| 1,713,658 | Hopkinson | May 21, 1929 |
| 1,942,797 | Bittaker | Jan. 9, 1934 |
| 2,014,010 | Wheatley | Sept. 10, 1935 |
| 2,066,265 | Freeman | Dec. 29, 1936 |
| 2,184,119 | Glynn | Dec. 19, 1939 |
| 2,354,446 | Brown | July 25, 1944 |
| 2,407,806 | Arnold et al. | Sept. 17, 1946 |
| 2,443,955 | Guzik | June 22, 1948 |
| 2,672,651 | Smyser | Mar. 23, 1954 |
| 2,697,252 | Clark | Dec. 21, 1954 |
| 2,791,805 | White | May 14, 1957 |